United States Patent Office 3,413,226
Patented Nov. 26, 1968

3,413,226
FLUORINE-CONTAINING COPOLYMERS
Lester E. Coleman, Cleveland, Ohio, assignor to The Lubrizol Corporation, Wickliffe, Ohio, a corporation of Ohio
No Drawing. Filed May 9, 1966, Ser. No. 548,382
7 Claims. (Cl. 252—51.5)

ABSTRACT OF THE DISCLOSURE

Copolymers and interpolymers of 100 parts (by weight) of an alkyl acrylate or an alkyl acrylamide with about 0.5–11 parts of a fluoroalkyl acrylate and, optionally, up to about 6 parts of an N-vinyl pyrrolidone or oxazolidone are useful as viscosity index improvers for lubricating oils. They are viscosity-temperature improvers, rather than thickeners, in that they contribute more to the lubricant viscosity at high temperatures than at low temperatures.

---

This invention relates to novel oil-soluble copolymers. More particularly, the invention is directed to copolymers of fluorine-containing acrylic esters with acrylic esters, acrylic amides and vinyl heterocyclic compounds. The invention relates further to lubricating compositions containing these novel fluorine-containing polymers which possess improved viscosity-temperature properties.

A good engine lubricating oil is one that will not thicken excessively at low temperatures or thin out excessively at elevated temperatures. The viscosity index is a measure of this viscosity-temperature relationship wherein a low value indicates relatively poor resistance to viscosity change with temperature, while high values indicate optimum resistance. While viscosity is an important limitation in low temperature engine starting, the pour point of the oil is also critical since oils having low pour points will flow to the pump intake, and oil circulation will be maintained throughout the engine once it has been started. Thus, a lubricating oil having the proper viscosity and a low pour point will reduce engine damage from the lack of oil flow to and from the circulating pump. Polymers and copolymers have been suggested in the art as additives which are useful for depressing the pour point of various lubricating oils while improving the viscosity index. However, many of the suggested polymers and copolymers are unsatisfactory; for example, some are oil-insoluble while others depress the pour point so little or change the viscosity characteristics so much as to make these additives undesirable.

Accordingly, it is an object of this invention to provide novel compositions of matter.

It is also an object of this invention to provide oil-soluble fluorine-containing copolymers.

It is another object of this invention to provide novel lubricating oil compositions having higher viscosity indices and improved viscosity-temperature characteristics.

These and other objects are achieved in accordance with this invention by providing an oil-soluble copolymer of:
(A) 100 parts of at least one compound having the general formula $$CH_2=C\begin{smallmatrix}R^1\\Y\end{smallmatrix}$$

wherein $R^1$ is hydrogen or methyl, and Y is a radical selected from the group consisting of $-COOR^2$, $-COONHR^3$ and mixtures thereof;

(B) about 0–6 parts by weight of a compound having the general formula $$CH_2=C\begin{smallmatrix}R^1\\N\end{smallmatrix}\begin{smallmatrix}O\\\parallel\\C\end{smallmatrix}\begin{smallmatrix}Q\\R^4\end{smallmatrix}$$
$$\begin{smallmatrix}C-C\\R^4\ R^4\ R^4\end{smallmatrix}$$

wherein $R^1$ is as defined above,
$R^2$ is an alkyl radical having at least about 8 carbon atoms, or a mixture of alkyl radicals having an average of at least about 8 carbon atoms,
$R^3$ is hydrogen or alkyl radical having up to 24 carbon atoms,
$R^4$ is hydrogen or an alkyl radical having up to 4 carbon atoms, and $$Q \text{ is } -O- \text{ or } -\begin{smallmatrix}R^4\\|\\C\\|\\R^4\end{smallmatrix}-$$

and
(C) about 0.5–11 parts by weight of a fluorine-containing ester have the structure $$CH_2=C-COOCH_2(CF_2CF_2)_x-H$$
$$\quad\quad\ |\\ \quad\quad\ R$$

wherein R is hydrogen or methyl, and x is an integer from one to about 10.

Component A

This component can be an ester or an amide of acrylic acid or methacrylic acid. The esters useful in the preparation of the copolymers of this invention have the general formula $$CH_2=C\begin{smallmatrix}R^1\\COOR^2\end{smallmatrix}$$

wherein $R^1$ is hydrogen or methyl, and $R^2$ is an alkyl radical having at least about 8 carbon atoms, or a mixture of alkyl radicals having an average of at least about 8 carbon atoms. The carbon atom limitation of $R^2$ insures the oil-solubility of the resulting polymer. Where oil-solubility is particularly troublesome, an alkyl radical having more than 8 carbon atoms is suggested. In other instances, some of the alkyl radicals may contain less than 8 carbon atoms with retention of good oil-solubility. Examples of alkyl radicals which have been found useful include 2-ethyl-hexyl, dodecyl, myristyl, cetyl, stearyl and octyl. When the higher molecular weight esters are used, it is possible to include some methyl, ethyl, propyl, or butyl acrylates or methacrylates without destroying the oil-solubility of the resulting polymer.

It is also possible to use as Component A amides having the general formula $$CH_2=C\begin{smallmatrix}R^1\\CONHR^3\end{smallmatrix}$$

wherein $R^1$ is hydrogen or methyl, and $R^3$ is hydrogen or an alkyl radical having up to about 24 carbon atoms. Such amides are obtained by reacting acrylic acid or a low moelcular weight acrylic ester with an amine such as butylamine, hexylamine, tetrapropylene amine, cetylamine, and tertiary-alkyl primary amines. The tertiary-alkyl primary amines referred to conform to the characterizing structure

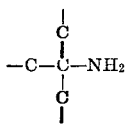

wherein a tertiary carbon atom, i.e., one devoid of hydrogen atoms, is bonded to a primary amino radical, i.e., —NH$_2$. Such tertiary-alkyl primary amines should contain at least about 6 and generally not more than about 24 carbon atoms in the tertiary-alkyl substituent. In most instances, the tertiary-alkyl substituent will contain from about 10 to about 24 carbon atoms. Specific examples of tertiary-alkyl primary amines useful for the purposes of this invention include tertiary-octyl primary amine, tertiary-decyl primary amine, tertiary-dodecyl primary amine, tertiary-tetradecyl primary amine, tertiary-hexadecyl primary amine, tertiary-eicosyl primary amine and tertiary-triacontyl primary amine. It is not necessary to use a single tertiary-alkyl primary amine; in fact, it is generally more convenient to use a commercial mixture of such amines wherein the tertiary-alkyl substituent contains from about 10 to about 24 carbon atoms. A typical mixture of such commercial tertiary-alkyl primary amines, for example, consists of tertiary-alkyl primary amines containing from about 12 to about 15 carbon atoms, said mixture averaging about 12 carbon atoms per amine molecule.

Tertiary-alkyl primary amine mixtures such as described above can be prepared by methods within the knowledge of those skilled in the art. For example, such mixtures may be prepared from polypropylene or polybutene fractions or mixtures thereof. Thus, a selected polymer fraction composed of mixed polyolefins within the desired molecular weight range can be converted to the corresponding tertiary-alkyl primary amines as follows. The selected polyolefin fraction is first hydrated by means of sulfuric acid in water to convert it into the corresponding alcohol mixture. The alcohol mixture is then converted to alkyl chloride by the reaction with dry hydrogen chloride. Finally, the alkyl chloride mixture is condensed under pressure with ammonia to produce the tertiary-alkyl primary amine mixture. Specific methods of preparing tertiary-alkyl primary amines are described in the Journal of Organic Chemistry, volume 20 (1955), beginning on page 295.

As mentioned previously, Component A may be an acrylic ester or amide. It may also be a mixture of any of the above compounds. For example, mixtures of decyl methacrylate and alkyl acrylamides are useful as Component A. The amounts of the various compounds in the mixture are determined by the desired oil solubility.

Component B

This component is an N-vinyl heterocyclic compound having the general formula

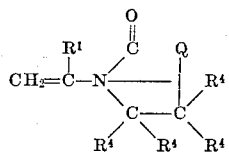

wherein R$^1$ is hydrogen or methyl, R$^4$ is hydrogen or an alkyl radical having up to 4 carbon atoms, and Q is —O— or =C(R$^4$)$_2$. That is, Component B may be a vinyl pyrrolidone or a vinyl oxazolidone. Examples of such N-vinyl heterocyclic compounds which have been found useful include N-vinyl pyrrolidone, N-vinyl oxazolidone, 3-methyl-1-vinyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 3,3,5-trimethyl-1-vinyl pyrrolidone, 5-methyl-5-ethyl-1-vinyl pyrrolidone, 4-methyl-1-vinyl oxazolidone, 5-methyl-1-vinyl oxazolidone, 4,5-dimethyl-1-vinyl oxazolidone, 5,5-dimethyl-1-vinyl oxazolidone, 4-ethyl-1-vinyl oxazolidone, 5-methyl-5-ethyl-1-vinyl oxazolidone and 4,4-dimethyl-5-ethyl-1-vinyl oxazolidone.

The presence of Component B is optional; that is, it may be present or absent depending on the properties which it is desired to impart to the polymer. When present, it should not constitute more than about 6 parts by weight per 100 parts of Component A; higher amounts than this detract from the oil solubility of the polymer.

Component C

This component is a fluorine-containing vinyl ester having the general formula

$$CH_2=C(R)-COOCH_2(CF_2CF_2)_x-H$$

wherein R is hydrogen or methyl, and $x$ is an integer from 1 to about 10. That is, these esters are esters of either acrylic or methacrylic acids.

These esters are readily prepared by reacting acrylic or methacrylic acids, their halides, anhydrides or their lower alkyl esters with tetrafluoroethylene:methanol telomers, i.e., primary perfluoroalkanols of the formula

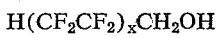

$$H(CF_2CF_2)_xCH_2OH$$

wherein $x$ is an integer from 1 to about 10.

The preparation of these perfluoroalkanols is described in U.S. Patent 2,559,628. In brief, a mixture of tetrafluoroethylene and methanol is heated at a temperature of from 50°–350° C. in the presence of a free radical-producing catalyst such as an organic or inorganic peroxide.

In general, from about 0.5 to about 11 parts by weight of the fluorine-containing vinyl ester will be utilized per 100 parts by weight of Component A in the monomer mixture. The preferred weight ratio, however, is from about 0.5 to about 7 parts by weight of Component C per 100 parts by weight of Component A.

The amount of Component C incorporated into the copolymers of this invention is critical where the oil solubility of the resulting polymer is to be considered. It has been discovered that when more than 11 parts of the fluorine-containing vinyl ester of Component C is incorporated into the copolymer, the resulting copolymer is generally oil-insoluble even at small concentrations. For example, a copolymer of 90 parts by weight of 2-ethylhexyl acrylate with 10 parts by weight of hexadecafluorononyl acrylate precipitates from an oil solution containing as little as 1.5% of the copolymer. It should be obvious that such a copolymer cannot be useful as a lubricant additive, and is therefore not contemplated as being within the scope of this invention.

The copolymers of this invention are obtained by mixing and heating the reactants with or without a solvent or dilutent in the presence of a small amount of a catalyst at a temperature of from about 25° C. to about 150° C., preferably from about 25° C. to about 100° C. The polymerization is more suitably conducted in a solvent such as oil, benzene, toluene, or aromatic naphtha. When a volatile solvent is used it may be distilled from the copolymer in the presence of an oil, which then displaces the volatile solvent. In some instances, the polymers may be isolated from the solvents by precipitation methods.

The polymerization catalyst may be any of the usual free radical types, including peroxides and azo compounds. Typical azo catalysts are azodiisobutyronitrile, dimethyl azodiisobutyrate, azodiisobutyramide, and other azo compounds wherein the azo group is acrylic and is preferably bonded to aliphatic carbon atoms, at least one of which is tertiary. Typical peroxides which are useful as catalysts are benzoyl peroxide, acetyl peroxide, capryl peroxide, lauryl peroxide, tertiary-butyl hydroperoxide, and cumene hydroperoxide.

Generally, Components A, B, and C are mixed with a solvent and a catalyst, and the mixture is maintained in a nitrogen atmosphere throughout the reaction period. The mixture is agitated or stirred in this nitrogen atmosphere at a temperature of from about 25° C. to about 150° C. until the polymerization is complete, generally from about 10 to 100 hours and most often about 20 hours. The reaction time will vary depending on the reaction temperature, the reactivity of the components, and other reaction conditions.

The exact nature of the polymers obtained by the process of this invention is not fully understood. It is observed, however, that the properties of the polymers are dependent on the choice of components and the ratios of the three components. Thus, although the composition of the polymer is controlled by such choice, the precise chemical composition remains unknown. The polymers of this invention may be characterized by the fluorine content and the viscosity of oil solutions containing the polymers of this invention.

The following examples illustrate the compositions of this invention and their preparation. Unless otherwise indicated, all parts are by weight.

EXAMPLE 1

A mixture of 38 parts of 2-ethylhexyl acrylate, 40 parts of white oil, 2 parts of hexadecafluorononyl acrylate and 0.2 part of benzoyl peroxide is maintained in a nitrogen atmosphere and agitated at 50° C. for 20 hours. The clear polymer obtained in this manner has a fluorine content of 1.46%.

EXAMPLE 2

The procedure of Example 1 is repeated except that 39.2 parts of 2-ethylhexyl acrylate and 0.8 part of the fluoroacrylate are used. The polymer obtained in this manner has a fluorine content of 0.56%.

EXAMPLE 3

A mixture of 38 parts of 2-ethylhexyl acrylate, 2 parts of dodecafluoroheptyl acrylate, 40 parts of white oil and 0.2 part of benzoyl peroxide is maintained in a nitrogen atmosphere and agitated at 50° C. for 20 hours. The resulting clear polymer solution has a fluorine content of 1.36%.

EXAMPLE 4

The procedure of Example 3 is repeated except that 39.2 parts of 2-ethylhexyl acrylate and 0.8 part of the fluoroacrylate are used. The clear polymer solution obtained in this manner has a fluorine content of 0.62%.

EXAMPLE 5

The procedure of Example 4 is repeated except that 38.4 parts of 2-ethylhexyl acrylate and 0.8 part of N-vinyl oxazolidone are used in lieu of 39.2 parts of the acrylate.

EXAMPLE 6

A mixture of 38 parts of 2-ethylhexyl acrylate, 2 parts of octafluoropentyl acrylate, 40 parts of white oil and 0.2 part of benzoyl peroxide is maintained in a nitrogen atmosphere and agitated at 50° C. for 20 hours. The resulting oil solution of the polymer has a fluorine content of 1.24%.

EXAMPLE 7

The procedure of Example 5 is repeated except that 39.2 parts of 2-ethylhexyl acrylate and 0.8 part of the fluoroacrylate are used. The resulting clear polymer solution has a fluorine content of 0.50%.

EXAMPLE 8

A mixture of 38 parts of 2-ethylhexyl acrylate, 2 parts of tetrafluoropropyl acrylate, 40 parts of white oil and 0.2 part of benzoyl peroxide is maintained in a nitrogen atmosphere and agitated at 50° C. for 20 hours to produce the desired copolymer.

EXAMPLE 9

The procedure of Example 8 is repeated except that 39.2 parts of 2-ethylhexyl acrylate and 0.8 part of the fluoroacrylate are used.

EXAMPLE 10

A mixture of 36 parts of decyl methacrylate, 4 parts of hexadecafluorononyl acrylate, 40 parts of benzene and 0.2 part of benzoyl peroxide is maintained in a nitrogen atmosphere and agitated for 40 hours at 60° C. The copolymer is then isolated by precipitation from methanol.

EXAMPLE 11

A mixture of 36 parts of decyl methacrylate, 4 parts of dodecafluoroheptyl acrylate, 40 parts of benzene and 0.2 part of benzoyl peroxide is maintained in a nitrogen atmosphere and agitated at 60° C. for 20 hours. The copolymer is isolated by pouring a benzene solution into methanol whereupon the copolymer precipitates. The copolymer is separated by filtration and dried.

EXAMPLE 12

The procedure of Example 11 is repeated except that the fluoroacrylate is replaced by 4 parts of tetrafluoropropyl acrylate.

EXAMPLE 13

A mixture of 38 parts of decyl methacrylate, 2 parts of hexadecafluorononyl methacrylate, 40 parts of white oil and 0.2 part of benzoyl peroxide is maintained in a nitrogen atmosphere and agitated at 50° C. for 20 hours to give the desired copolymer.

EXAMPLE 14

A mixture of 36 parts of decyl methacrylate, 2 parts of N-vinyl oxazolidone, 2 parts of hexadecafluorononyl acrylate, 40 parts of white oil and 0.2 part of alpha,alpha'-azodiisobutyronitrile (AIBN) is maintained in a nitrogen atmosphere and agitated at 50° C. for 5 days to give the desired terpolymer.

EXAMPLE 15

A mixture of 36 parts of decyl methacrylate, 4 parts of hexadecafluorononyl methacrylate, 40 parts of white oil and 0.2 part of benzoyl peroxide is maintained in a nitrogen atmosphere and agitated at 50° C. for 20 hours to give the desired copolymer.

EXAMPLE 16

The procedure of Example 15 is repeated except that the decyl methacrylate is replaced by a mixture of 20 parts of stearyl methacrylate and 14 parts of laurylmyristyl methacrylate and 4 parts of n-butyl methacrylate.

EXAMPLE 17

A mixture of 38 parts of 2-ethylhexyl acrylate, 2 parts of hexadecafluorononyl methcrylate, 40 parts of white oil and 0.2 part of benzoyl peroxide is maintained in a nitrogen atmosphere at 50° C. for 20 hours to give the desired copolymer.

EXAMPLE 18

A mixture of 36 parts of decyl methacrylate, 2 parts of N-t-butyl acrylamide and 2 parts of hexadecafluorononyl acrylate, 40 parts of white oil and 0.2 part of AIBN is maintained in a nitrogen atmosphere at 50° C. for 42 hours to give the desired terpolymer.

EXAMPLE 19

A mixture of 32 parts of decyl methacrylate, 4 parts of N-t-octyl acrylamide, 4 parts of hexadecafluorononyl methacrylate, 40 parts of white oil and 0.08 part of AIBN is maintained in a nitrogen atmosphere at 50° C. for 70 hours to produce the desired terpolymer.

EXAMPLE 20

The procedure of Example 19 is repeated except that the fluoroalkyl methacrylate is replaced by 4 parts of hexadecafluorononyl acrylate.

EXAMPLE 21

The procedure of Example 14 is repeated except that N-vinyl pyrrolidone is used in lieu of the N-vinyl oxazolidone.

The fluorine-containing copolymers of this invention are useful as additives in lubricating oils, rubber compositions, paints, plasticizers and other polymeric materials. When added to lubricating oil, the copolymers of this invention improve the frictional characteristics and extreme pressure properties of the lubricants. The fluorine-containing copolymers of this invention are particularly useful to improve the viscosity index and viscosity-temperature relationship of the lubricants to which they are added. These properties are determined by measuring the viscosity of a copolymer solution at 100° F. and 210° F. from which the specific viscosity can be calculated. The specific viscosity is defined by the formula $$\frac{\text{viscosity of the polymer solution}}{\text{viscosity of pure solvent}} - 1$$

The ratio of the specific viscosity at 210° F. to the specific viscosity at 100° F., referred to as the E ratio, is a measure of the copolymer's contribution to the viscosity as a function of temperature. Where the E value is less than 1, the copolymer is a thickener; where E is greater than 1, the copolymer is considered to be a viscosity-temperature improver.

The viscosity-temperature improving properties of the copolymers of this invention are demonstrated by dissolving the copolymers in an SAE 10W-30 mineral oil at 1.5% by weight of chemical. The viscosities of these solutions are determined at 210° F. and 100° F., and the VI and E values determined from these viscosities. From the foregoing discussion, it should be obvious that the higher the E value for the solution of the copolymer, the better that copolymer will perform as a viscosity-temperature improver.

The VI and E values of several lubricating compositions containing the copolymers of this invention are summarized in the following tables. Table I lists the values for solutions of copolymers of 2-ethylhexyl acrylate, while Table II lists the values for solutions of copolymers of decyl methacrylate.

TABLE I.—VISCOSITY VALUES OF OIL SOLUTIONS OF 2-ETHYLHEXYL ACRYLATE POLYMERS

| Co-monomer [1] | | Weight ratio | Product of example | SUS 210° | SUS 100° | Viscosity index | E |
|---|---|---|---|---|---|---|---|
| R | X | | | | | | |
| Non | | | | 65.3 | 366 | 133 | 1.08 |
| H | 4 | 98:2 | 2 | 63.7 | 341 | 135 | 1.18 |
| H | 4 | 95:5 | 1 | 61.5 | 306 | 138 | 1.39 |
| H | 4 | 90:10 | | 55.1 | 222 | 146 | [2] 5.62 |
| CH₃ | 4 | 95:5 | 17 | 57.7 | 276 | 136 | 1.50 |
| H | 3 | 98:2 | 4 | 63.5 | 338 | 135 | 1.20 |
| H | 3 | 95:5 | 3 | 61.7 | 311 | 137 | 1.36 |
| H | 3 | 90:10 | | 56.2 | 227 | 148 | [2] 4.70 |
| H | 2 | 98:2 | 7 | 64.1 | 346 | 135 | 1.17 |
| H | 2 | 95:5 | 6 | 62.3 | 317 | 137 | 1.36 |
| H | 2 | 90:10 | | 56.7 | 239 | 145 | [2] 3.14 |
| H | 1 | 98:2 | 9 | 64.1 | 349 | 134 | 1.15 |
| H | 1 | 95:5 | 8 | 62.9 | 322 | 137 | 1.32 |
| H | 1 | 90:10 | | 59.0 | 247 | 148 | [2] 2.65 |

[1] $CH_2=\underset{R}{C}-COOCH_2(CF_2CF_2)_x-H$

[2] Precipitates out of solution.

TABLE II.—VISCOSITY VALUE OF OIL SOLUTIONS OF POLYMERS OF DECYL METHACRYLATE

| Co-monomer [1] | | Weight ratio | Product of example | SUS 210° | SUS 100° | Viscosity index | E |
|---|---|---|---|---|---|---|---|
| R | X | | | | | | |
| None | | | | 87.8 | 520 | 140 | 1.14 |
| H | 4 | 90:10 | 10 | 79.8 | 421 | 144 | 1.39 |
| CH₃ | 4 | 90:10 | 15 | 78.2 | 374 | 149 | 1.69 |
| CH₃ | 4 | 95:5 | 13 | 79.2 | 433 | 142 | 1.29 |
| H | 3 | 90:10 | 11 | 81.6 | 420 | 146 | 1.46 |
| H | 1 | 90:10 | 12 | 78.0 | 408 | 144 | 1.40 |

[1] As defined in Table I.

It should be noted from these results that the VI's are fairly independent of the length of the fluoroalkyl chain, and the presence of a small amount of the fluoroalkyl acrylate comonomer significantly enhances the E value of the oil solution as compared to the homopolymer containing no fluoroalkyl acrylate. It should also be noted that 10% by weight of the fluoroalkyl acrylate generally appears to be the maximum amount of this acrylate which can be incorporated into the polymer without affecting its oil solubility. For example, an oil solution of a copolymer of 90 parts by weight of 2-ethylhexyl acrylate with 10 parts by weight of hexadecafluorononyl acrylate has an improved viscosity index and E value but does not remain in solution on standing.

What is claimed is:

1. A lubricating composition comprising a major proportion of mineral lubricating oil and a minor proportion of an oil-soluble copolymer of:

(A) 100 parts by weight of at least one compound having the general formula

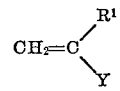

where Y is a radical selected from the group consisting of —COOR² and mixtures thereof with —CONHR³, R¹ is hydrogen or methyl, R² is an alkyl radical having at least about 8 carbon atoms, or a mixture of alkyl radicals having an average of at least about 8 carbon atoms, and R³ is hydrogen or an alkyl radical having up to 24 carbon atoms;

(B) about 0–6 parts of a compound having the general formula

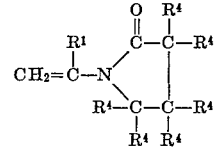

wherein $R^1$ is as defined above, and $R^4$ is hydrogen or an alkyl radical having up to 4 carbon atoms; and (C) about 0.5–11 parts of a fluorine-containing ester having the structure

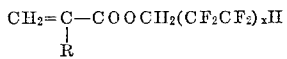

wherein R is hydrogen or methyl, and $x$ is an integer from one to about 10.

2. The lubricating composition of claim 1 wherein Y is —$COOR^2$.

3. The lubricating composition of claim 1 wherein Y is a mixture of —$COOR^2$ and —$CONHR^3$.

4. The lubricating composition of claim 1 wherein component (A) is 2-ethylhexyl acrylate.

5. A lubricating composition according to claim 1 which comprises 100 parts by weight of a mineral lubricating oil and about 0.01–20 parts by weight of an oil-soluble copolymer of:

(1) 100 parts of a vinyl ester having the general formula

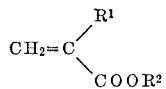

wherein $R^1$ is hydrogen or methyl, and $R^2$ is an alkyl radical having at least about 8 carbon atoms or a mixture of alkyl radicals having an average of at least about 8 carbon atoms; and (2) from about 0.5–11 parts of a fluorine-containing ester having the structure

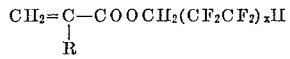

wherein R is hydrogen or methyl, and $x$ is an integer from 1 to about 5.

6. The lubricating composition of claim 5 wherein component (1) is decyl methacrylate.

7. The lubricating composition of claim 5 wherein component (1) is 2-ethylhexyl acrylate.

References Cited

UNITED STATES PATENTS 2,628,958  2/1953  Bittles.
2,818,362  12/1957  Drechsel _____ 260—88.3 XR PATRICK P. GARVIN, *Primary Examiner.*

UNITED STATES PATENT OFFICE
CERTIFICATE OF CORRECTION

Patent No. 3,413,226                                                  November 26, 1968

Lester E. Coleman

It is certified that error appears in the above identified patent and that said Letters Patent are hereby corrected as shown below:

Column 2, lines 3 to 9 and column 3, lines 57 to 64, the formula, each occurrence, should appear as shown below:

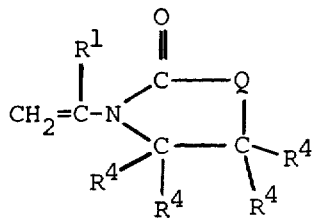

Column 4, line 55, "dilutent" should read -- diluent --; line 68, "acrylic" should read -- acyclic --. Columns 7 and 8, TABLE I, first column, line 1 thereof, "Non" should read -- None --.

Signed and sealed this 31st day of March 1970.

(SEAL)
Attest:

EDWARD M. FLETCHER, JR.                               WILLIAM E. SCHUYLER, JR.
Attesting Officer                                               Commissioner of Patents